March 19, 1968   J. PALFREYMAN ET AL   3,373,567
JET PROPULSION POWERPLANT WITH AFTERBURNING
COMBUSTION EQUIPMENT
Filed April 27, 1966   2 Sheets-Sheet 1
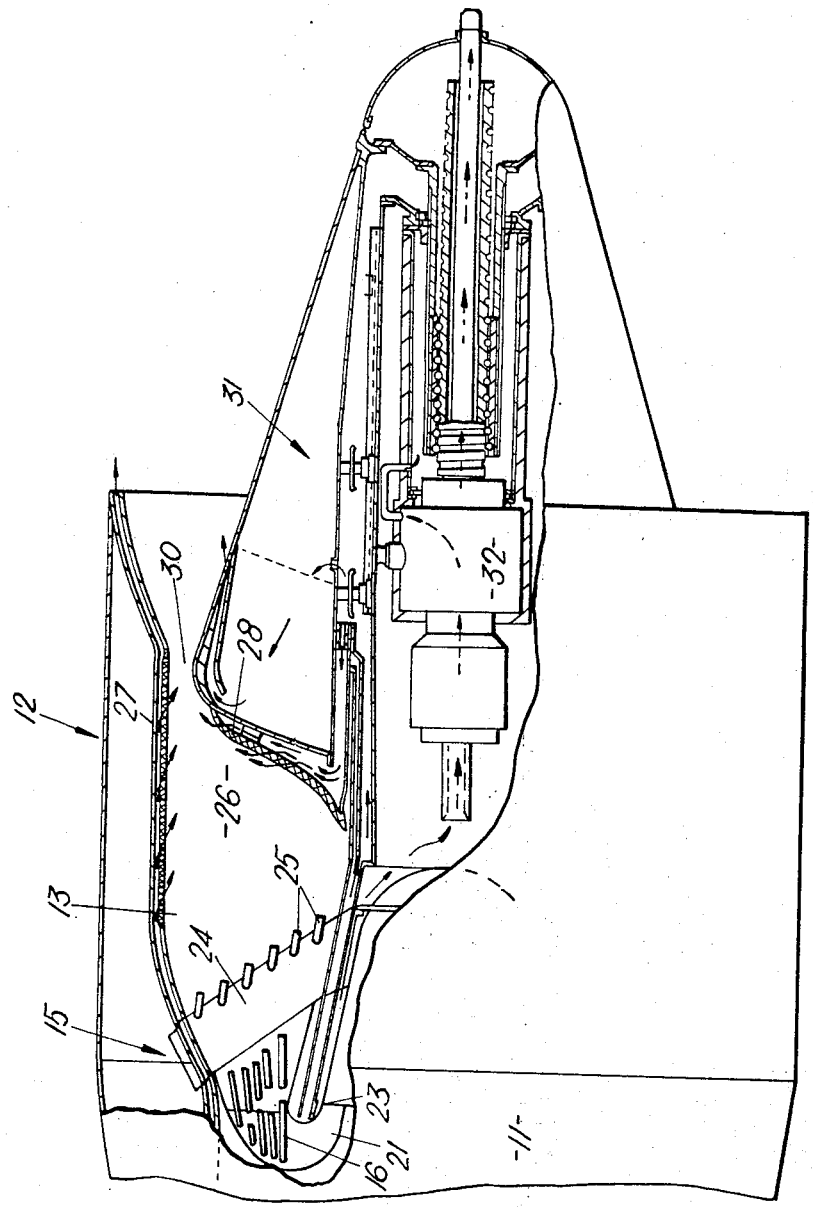
Fig.1.
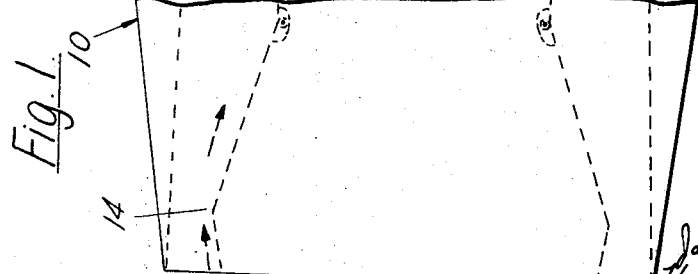
Inventors
Jack Palfreyman
Herbert Frank Smith
By
Cushman, Darby & Cushman
Attorneys

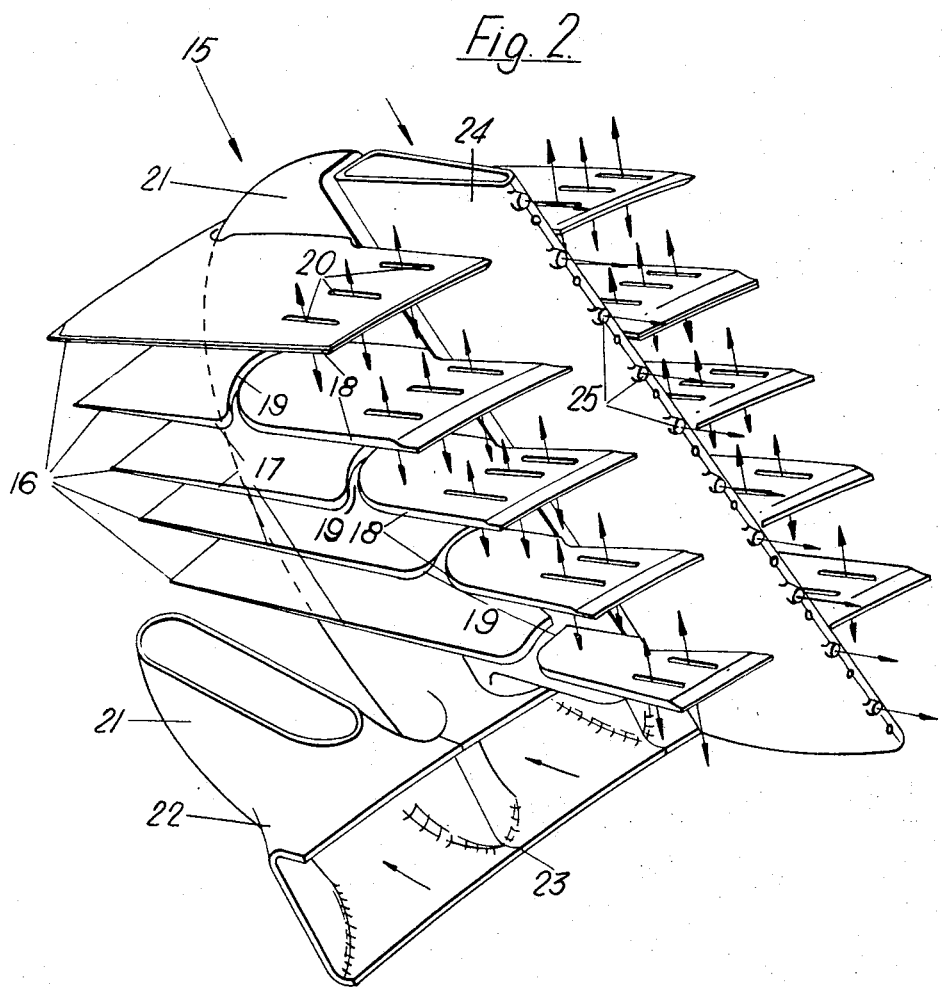

United States Patent Office
3,373,567
Patented Mar. 19, 1968

3,373,567
JET PROPULSION POWERPLANT WITH AFTER-BURNING COMBUSTION EQUIPMENT
Jack Palfreyman, Tansley, near Matlock, and Herbert Frank Smith, Allentown, Derby, England, assignors to Rolls-Royce Limited, Derby, England, a British company
Filed Apr. 27, 1966, Ser. No. 545,607
Claims priority, application Great Britain, May 11, 1965, 19,936/65
13 Claims. (Cl. 60—264)

ABSTRACT OF THE DISCLOSURE

A powerplant having first and second combustion equipment in flow series, fuel being burnt in the second combustion equipment in hot gases supplied from the first combustion equipment through perforated flow-dividing walls of a multiple diffuser duct upstream of the second combustion equipment.

---

This invention concerns improvements in or relating to jet propulsion powerplant.

According to the invention in one aspect thereof there is provided combustion equipment for a jet propulsion powerplant comprising an air flow duct which is divergent in a downstream direction, a plurality of flow dividing members spaced apart across the duct and extending in a downstream direction therein, adjacent said members diverging with respect to each other in a downstream direction to define therebetween a plurality of diffuser ducts in parallel, and means for supplying fuel to said flow duct, combustion of said fuel taking place in air which has passed through said diffuser ducts.

Preferably the said flow duct is annular and said flow dividing members extend circumferentially and axially therein and are spaced apart radially.

By arranging a plurality of diffuser ducts in parallel, this invention is able to achieve a reduction in the effective diffusing length of gases passing into the combustion equipment. Thus, the angle of divergence in an axial plane between adjacent flow dividing members is preferably between 6° and 7°.

Preferably, where the flow duct is annular, a plurality of radial struts extend radially completely across said flow duct at the upstream end thereof, said struts being spaced apart at equal angular intervals. Each said strut may have a hollow interior which communicates with the flow duct through a plurality of nozzles provided in or adjacent the trailing edge of the strut, said fuel supply means being adapted to supply fuel to each said hollow interior.

According to the invention in another aspect thereof, there is provided a jet propulsion powerplant having a first combustion equipment, a second combustion equipment constructed and arranged as defined above, and means for passing combustion products from said first combustion equipment through the diffuser ducts of the second combustion equipment.

Preferably each said flow dividing member is provided with a hollow downstream portion the interior of which communicates with the flow duct through a plurality of apertures in the walls of said portion, said means for passing combustion products into the flow duct comprising at least one manifold adapted to be supplied with said combustion products and communicating with the interior of each said hollow portion. A plurality of manifolds may be provided, each being formed as a continuation upstream of each said radial strut.

In preferred applications of the invention, the flow duct is adapted to be supplied with ram air and the first combustion equipment comprises a rocket motor.

The invention also comprises an aircraft provided with a powerplant as defined above.

The invention will be described merely by way of example with reference to the accompanying drawings in which:

FIGURE 1 is a side elevation, partly in section of a powerplant incorporating combustion equipment according to the invention, and FIGURE 2 is a cut-away perspective view of part of the powerplant shown in FIGURE 1.

Referring to the drawings, FIGURE 1 shows a powerplant 10 for supersonic aircraft jet propulsion having first combustion equipment, indicated generally at 11 and second combustion equipment 12. The first combustion equipment 11 comprises a rocket motor (not shown) which is adapted to burn kerosene fuel using liquid oxygen as oxidant. The second combustion equipment 12 is disposed in an annular flow duct 13 which is supplied with ram air from a convergent-divergent air intake 14. The construction of the second combustion equipment 12 is described below.

A diffuser duct assembly 15 is located in a divergent portion of the upstream end of the flow duct 13. The diffuser duct assembly 15 comprises (FIGURE 2) a plurality of circumferentially and axially extending flow dividing members 16 which are spaced at equal radial intervals across the upstream end of the flow duct 13. Each flow dividing member 16 diverges in a downstream direction with respect to each immediately adjacent flow dividing member 16 at an angle of divergence between 6° and 7° taken in an axial plane. The total effective divergence of the diffuser duct assembly 15 is therefore several times this angle, since the diffuser ducts defined between each adjacent pair of flow dividing members 16 are arranged, in effect, in parallel. This large effective divergence gives rise to a relatively short effective diffusing length for the diffuser duct assembly, leading to an economy in overall length.

Each flow dividing member 16 has a solid upstream portion 17 and a hollow downstream portion 18. The interior of each downstream portion 18 communicates with the flow duct 13 through a plurality of axially extending slots 20 spaced apart at equal circumferential intervals in each wall of the flow dividing member 16 adjacent the trailing edge thereof. Except for the radially outermost flow dividing member 16, the two portions 17, 18 of each member 16 are separated by a small gap 19.

Combustion products from the first combustion equipment 11 are passed into the second combustion equipment 12 by way of a plurality of manifolds 21 each of which extends radially across the upstream end of the flow duct 13. The manifolds 21 are equiangularly spaced apart in the flow duct 13 and each is formed with a rearwardly facing inlet scoop 22 which communicates with an annular outlet passage 23 leading from the first combustion equipment 11. Each manifold 21 communicates with the hollow interiors of the downstream portions 18 of each flow dividing member 16 through axially extending slots (not shown) in the circumferentially facing side walls of each manifold 21. Thus the said combustion products pass through the manifolds 21 into the hollow interiors of the hollow flow divider portions 18 and thence into the flow duct 13 at the downstream end of the diffuser duct assembly 15 by way of the slots 20. The flow paths of said combustion products are indicated in FIGURE 2 by arrows with solid black heads.

A plurality of equiangularly spaced apart hollow struts 24 extend radially completely across the upstream end of the flow duct 13, each strut 24 being disposed immediately downstream of and aligned with each respective manifold 21, so that the manifolds 21 are effectively formed as continuations upstream of the struts 24. Each strut 24 is inclined to the axis of the annular flow duct 13, the radially outer end of each strut 24 being upstream of the radially inner end thereof. A plurality of nozzles 25 is provided in the trailing edge of each strut 24, each nozzle 25 extending a short distance in a substantially axial direction and communicating with the hollow interior of the respective strut 24.

Means (not shown) are provided for supplying fuel (e.g., kerosene), additional to that supplied to the first combustion equipment 11, to the second combustion equipment 12 by way of the hollow interiors of the struts 24 and the nozzles 25. The flow path of this additional fuel is indicated in FIGURE 2 by arrows with white heads. Means (not shown) are provided in the flow duct 13 downstream of the struts 24 for igniting fuel injected by the nozzles 25.

The portion of the annular flow duct 13 downstream of the struts 24 forms the combustion chamber 26 of the second combustion equipment 12. Fuel injected at the nozzles 25 is burnt in the ram air flowing into the combustion chamber 26 from the diffuser duct assembly 15. Any unburnt fuel in the combustion products entering the combustion chamber 26 through the slots 20 is also burnt in this ram air.

The walls of the combustion chamber 26 are formed by an outer double-walled lining member 27 and an inner double-walled lining member 28, the members 27, 28 converging downstream of the combustion zone to a throat 30. Downstream of the throat 30 the lining members 27, 28 diverge, so that a convergent-divergent exhaust nozzle is formed thereby.

The inner lining member 28 is carried by a bullet member 31 which is disposed centrally of the flow duct 13. The axial position of the bullet member 31 relative to the outer lining member 27 is adjustable by means of a screw-jack actuator 32 of known type whereby the geometry and effective throat area of the said convergent-divergent nozzle may be varied.

The innermost walls of the respective double-walled lining members 27, 28 are formed with a foraminous or porous structure and cooling air is supplied to the spaces between the respective innermost and outermost walls. This cooling air is derived from the flow duct 13 upstream of the diffuser duct assembly 15 and flows into the combustion chamber 26 through the said porous or foraminous innermost walls to provide film cooling of the respective lining members 27, 28.

In some circumstances the first combustion equipment 11 has excess fuel supplied to it in order to keep the temperature therein as low as possible. In these conditions, the unburnt, excess fuel entering the second combustion equipment 12 from the first combustion equipment 11 may be sufficient to render a separate fuel supply to the second combustion equipment 12 unnecessary.

We claim:

1. In a jet propulsion powerplant: first combustion equipment; second combustion equipment comprising an air flow duct divergent in a downstream direction, a plurality of flow dividing members spaced apart across said duct and extending in a downstream direction therein, each of said flow dividing members having a hollow downstream portion with a perforated wall for providing communication between the interior of the hollow downstream portion and said air flow duct, adjacent ones of said flow dividing members diverging with respect to each other in a downstream direction and defining therebetween a plurality of diffuser ducts in parallel, and means for supplying fuel to said air flow duct, combustion of said fuel taking place in air which has passed through said diffuser ducts; and means passing combustion products from said first combustion equipment through the diffuser ducts of the second combustion equipment, said last mentioned means including at least one manifold adapted to be supplied with combustion products and communicating with the interior of each hollow downstream portion of said flow dividing members.

2. A powerplant as claimed in claim 1 wherein said air flow duct is annular and said flow dividing members extend circumferentially and axially therein and are spaced apart radially.

3. A powerplant as claimed in claim 1 wherein said flow dividing members have an angle of divergence between 6° and 7° in an axial plane between adjacent flow dividing members.

4. A powerplant as claimed in claim 1 wherein said air flow duct is annular and including a plurality of struts extending radially completely across said air flow duct at the upstream end thereof, said struts being spaced apart at equal angular intervals.

5. A powerplant as claimed in claim 4 wherein each of said radial struts is inclined to the axis of said air annular flow duct and has a radially outer end positioned upstream of its radially inner end.

6. A powerplant as claimed in claim 1 including a plurality of radial struts extending across said air flow duct and a plurality of manifolds, each of said manifolds being formed as a continuation upstream of one of said radial struts.

7. A powerplant as claimed in claim 6 wherein each said strut has a hollow interior which communicates with the air flow duct through a plurality of nozzles provided adjacent the trailing edge of the strut, said fuel supply means being adapted to supply fuel to each said hollow interior.

8. A powerplant as claimed in claim 1 including rearwardly facing scoops which provide communication between each of said manifolds and said first combustion equipment.

9. A powerplant as claimed in claim 1 wherein each of said perforated walls of the hollow portion of each of said flow dividing members is axially slotted.

10. A powerplant as claimed in claim 1 wherein said air flow duct is supplied with ram air.

11. A powerplant as claimed in claim 1 wherein said first combustion equipment comprises a rocket motor.

12. A powerplant as claimed in claim 1 including a convergent-divergent exhaust nozzle provided downstream of said air flow duct.

13. A powerplant as claimed in claim 12 wherein said convergent-divergent nozzle comprises an outer wall and a bullet member spaced radially inwardly therefrom and defining therewith an annular throat, and means for moving said bullet member axially relative to said outer wall to vary the geometry of said throat.

References Cited

UNITED STATES PATENTS

| | | | |
|---|---|---|---|
| 2,482,505 | 9/1949 | Pierce | 60—270 |
| 2,656,676 | 10/1953 | Kallal | 60—270 |
| 2,735,263 | 2/1956 | Chashafian | 60—270 |
| 2,811,827 | 11/1957 | Kress | 60—261 |
| 3,030,005 | 4/1962 | Nabour | 60—261 |
| 3,046,742 | 7/1962 | Egbert | 60—246 |
| 3,085,401 | 4/1963 | Lefebvre | 60—39.69 |
| 3,229,632 | 1/1967 | Wilde | 60—39.74 |

FOREIGN PATENTS

| | | |
|---|---|---|
| 787,866 | 12/1957 | Great Britain. |
| 906,865 | 9/1962 | Great Britain. |

CARLTON R. CROYLE, *Primary Examiner.*

MARK NEWMAN, *Examiner.*

D. HART, *Assistant Examiner.*